Patented Feb. 5, 1935

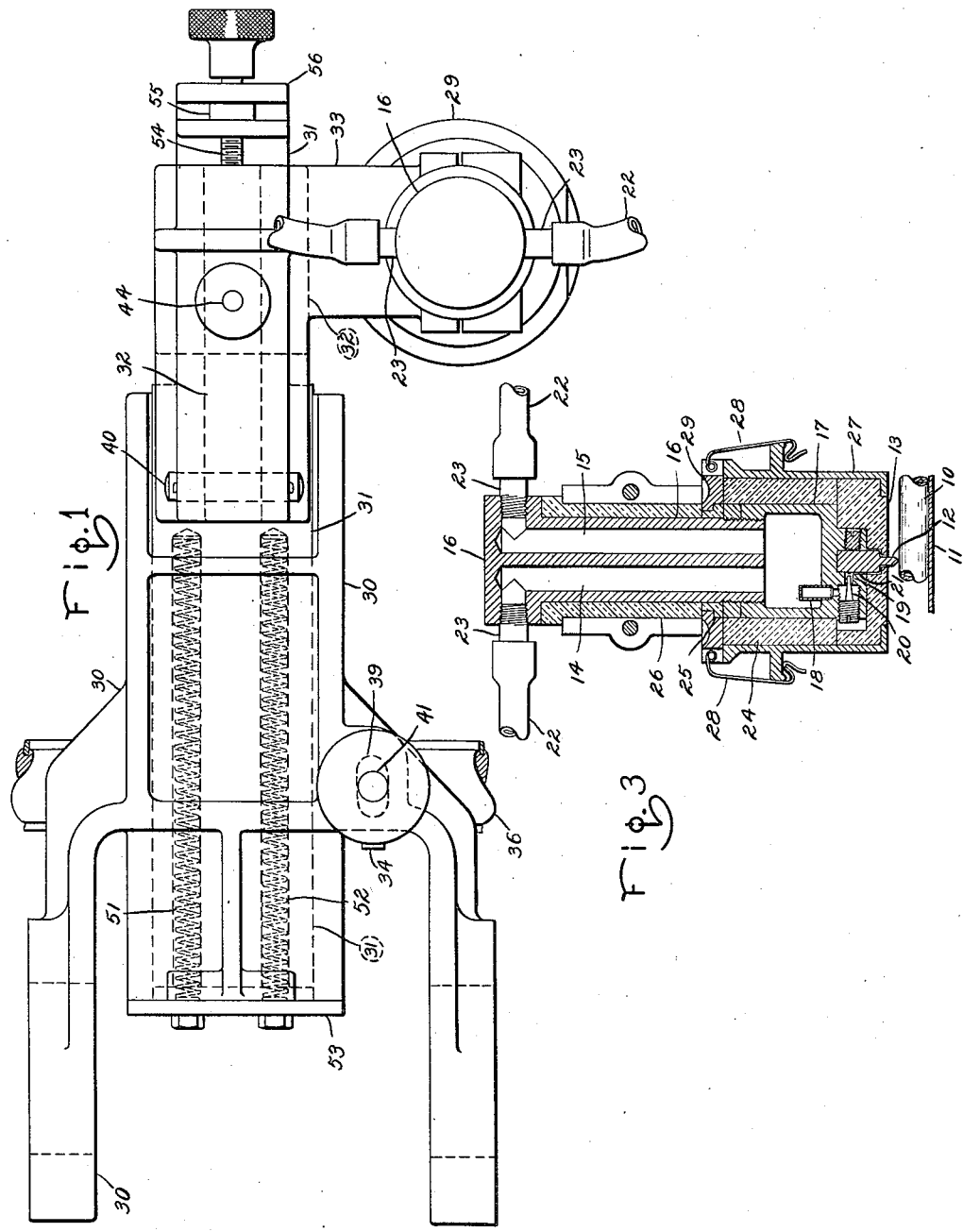

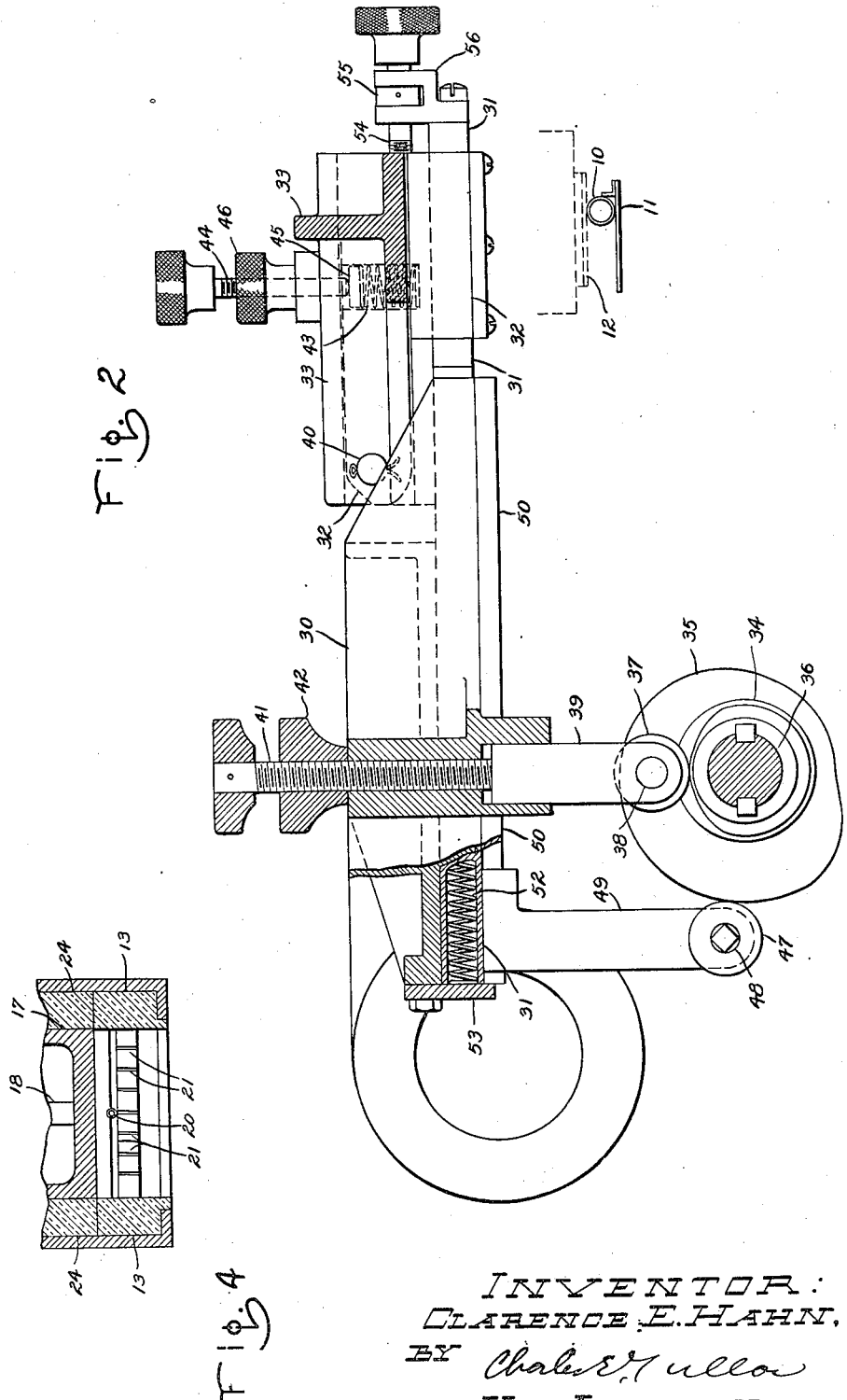

1,990,375

UNITED STATES PATENT OFFICE 1,990,375

APPARATUS FOR CUTTING GLASS

Clarence E. Hahn, Cleveland Heights, Ohio, assignor to General Electric Company, a corporation of New York Application November 29, 1932, Serial No. 644,820

4 Claims. (Cl. 49—48)

My invention relates to apparatus for cutting glass bodies and more particularly to methods and apparatus for cutting glass bodies which are applicable to continuous tube drawing such as provided by the machine disclosed in Patent 1,219,709, to Danner. An object of my invention is to provide apparatus for cutting a continuous moving glass product such as glass tubing which is in a heated state, preferably because of its recent manufacture. Other features and advantages of my invention will appear from the drawings and the description which follows of a species thereof.

Referring now to the drawings, Figs. 1 and 2 are plan and side elevations respectively of the apparatus of my invention; Fig. 3 is a vertical section through the cutting head of this apparatus; and Fig. 4 is a vertical section at 90° to that of Fig. 3 of a portion thereof.

The specific embodiment of my invention shown in the drawings is for use on the glass rod or tube feeding machine disclosed in Danner Patent 1,220,201, and is constructed so as to replace the cutting unit comprised thereby. The glass rod or tubing 10 which is to be cut by my apparatus passes longitudinally along a solidly mounted table 11 and is, due to its very recent manufacture, at approximately 200° to 300° Fahrenheit. The rod or tubing is engaged by knife 12 of my apparatus, as shown in Figs. 2 and 3, while both are traveling at the same rate of speed, and the cold knife chills that portion of the tubing contacted thereby. Knife 12 is preferably cooled to approximately 40° Fahrenheit and is moistened by the gradual seepage of water from block 13 surrounding the lower portion thereof. Both of these effects are produced by water at slightly lower temperature which is circulated through passages 14 and 15 in spindle 16 and the interior of head 17 and which is caused to pass outward onto the block 13 through screen 18 and valve 19. Needle 20 allows the amount of water passing through the valve to be adjusted and grooves 21 (Fig. 4) along the face of the slot in which the knife is held distribute the water to block 13 which by its relatively loose fit therewith or its porous condition, or both, distributes the moisture evenly over the knife. The block 13 is preferably made of wood or a synthetic resin such as bakelite or durite. Flexible tubes 22 which are connected to spindle 16 through pipes 23 provide the supplying and draining means necessary to provide circulation of the cooling liquid. The chilled portion of the apparatus is heat insulated by block 13, sleeve 24, collar 25 and sleeve 26 which preferably are of like material. Block 13 and sleeve 24 are held in place by cap 27 which is in turn held in place by springs 28 extending from collar 29. This collar also acts as a gutter in order to carry the moisture forming on the upper portion of the apparatus away from the glass tubing so as to avoid accidental breakage thereof by cold liquid dropping thereon. Said collar is also prevented from moving vertically by engagement with insulating collar 25.

Both the vertical movement which carries the knife into contact with the glass rod or tubing and the horizontal movement which keeps the chilled cutting head in position thereon are produced by corresponding movements of yoke 30. The yoke is connected to the head through slide 31, subslide 32 and bracket 33 and is moved horizontally by mechanism shown in the Danner patent hereinbefore referred to which also keeps cams 34 and 35 on shaft 36 aligned with this apparatus. The vertical movement occurs as the lower portion of cam 34 is carried below roller 37 on pin 38 in rod 39 and only causes the knife edge to engage the rod or tubing as bracket 33 swings freely from pin 40 in subslide 32. The vertical lift of the cam may be adjusted by turning screw 41 which then can be locked in position by nut 42. The pressure with which the knife bears on the rod or tubing is controlled by spring 43, the upward pressure of which lessens the downward pressure produced by the combined weight of the bracket and cutting head. The upward pressure of the spring 43 is controlled by screw 44, block 45 and lock nut 46.

During the period of the knife's engagement another horizontal motion takes place which causes the tubing to be scored. The movement is transverse to the line of motion of the tubing and causes a portion of the knife edge to pass back and forth across said tubing. The motion occurs as a low portion of cam 35 passes into and out of position below roller 47 on pin 48 of arm 49 which causes slide 31 to move in the ways in yoke 30 in which it is held by plate 50. Springs 51 and 52 which are located in longitudinal apertures in the slide and which bear against plate 53 attached to yoke 30 and said slide cause roller 47 to follow the irregularities of the cam. As only a portion of the knife's edge is used at once, adjustment of the position of sub-slide 32 on slide 31 is provided by screw 54, collar 55 and bracket 56 thereby providing for use of another portion of the knife's edge when one portion becomes dull. That portion of the cycle of operation covering the actual cutting of the tube has now been described and the cutting apparatus has but to rise and move back to its original position to complete one cycle of operation.

What I claim as new and desire to secure by Letters Patent of the United States, is:

1. In an apparatus of the class described, the combination with means for feeding a heated glass body, of a severing means comprising a knife, means for supplying liquid to said knife and distributing the same over the contacting surface thereof, means for causing a relative movement at intervals between said knife and glass body to cause the former to engage the latter, means for regulating the pressure of said engagement and means for causing a transverse movement of said knife to cause it to score the glass body.

2. In an apparatus of the class described, the combination with means for feeding a heated glass body of severing means comprising a cutting head or unit pivotally mounted comprising a liquid carrying receptacle, a cutting knife attached thereto so as to be chilled thereby, a valve for withdrawing liquid from said receptacle and a block for distributing said liquid to the knife, means for causing a relative movement at intervals between said unit and glass body, means for causing the knife to engage said glass body, and a spring with means for controlling its tension for counteracting the weight of the cutting unit thereby controlling the pressure of engagement between said knife and glass body.

3. In an apparatus of the class described, the combination with means for feeding heated glass of a severing means comprising a knife, means for supplying liquid to said knife and for distributing the same over its contacting surface comprising a liquid receptacle, a valve for controlling the passage of liquid therefrom and a block with grooves therein for distributing said liquid, and means for causing a relative movement at intervals between said knife and glass to cause the former to engage the latter.

4. In an apparatus of the class described, the combination with means for feeding a heated glass body of severing means comprising a knife, means for chilling and wetting said knife with liquid, a slide upon which said knife and means are mounted, an arm or yoke in which said slide is mounted, a cam for vertically moving said arm to cause the knife to engage said glass body and another cam for moving said slide within the arm to cause the knife to score said glass body.

CLARENCE E. HAHN.